United States Patent
Kawase et al.

(10) Patent No.: US 9,618,721 B2
(45) Date of Patent: *Apr. 11, 2017

(54) IMAGING APPARATUS AND IMAGING SIGNAL CORRECTING METHOD

(71) Applicant: SONY CORPORATION, Tokyo (JP)

(72) Inventors: Masamiki Kawase, Tokyo (JP); Hidekazu Suto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/661,381

(22) Filed: Mar. 18, 2015

(65) Prior Publication Data

US 2015/0192753 A1 Jul. 9, 2015

Related U.S. Application Data

(63) Continuation of application No. 13/076,171, filed on Mar. 30, 2011, now Pat. No. 9,207,426.

(30) Foreign Application Priority Data

Apr. 7, 2010 (JP) ................................ 2010-088960

(51) Int. Cl.
*H04N 5/262* (2006.01)
*H04N 5/225* (2006.01)
(Continued)

(52) U.S. Cl.
CPC ......... *G02B 7/023* (2013.01); *G02B 13/0015* (2013.01); *G03B 17/14* (2013.01);
(Continued)

(58) Field of Classification Search
CPC .. G02B 13/18; G02B 13/009; G02B 13/0015; G02B 27/0025; G02B 13/006; G02B 27/646; G02B 15/20; G02B 15/22; H04N 5/2254; H04N 5/23296; H04N 7/183; H04N 9/04; G03B 3/00; G03B 13/32; B60R 1/00
(Continued)

(56) References Cited

U.S. PATENT DOCUMENTS 6,323,934 B1 11/2001 Enomoto
7,671,917 B2 * 3/2010 Izukawa ............ H04N 5/23209
348/340
(Continued)

FOREIGN PATENT DOCUMENTS

JP 2008-96907 4/2008

*Primary Examiner* — Trung Diep
(74) *Attorney, Agent, or Firm* — Frommer Lawrence & Haug LLP; William S. Frommer (57) ABSTRACT

An imaging apparatus includes: a lens mount section; an imager having an imaging plane on which an image having an image height obtained through a lens device mounted to the lens mount section is formed; an imaging process section correcting transverse chromatic aberration of an imaging signal obtained by the imager; and a control section determining an imager size in accordance with the diameter of the lens device mounted to the lens mount section and correcting a correction coefficient for the correction of transverse chromatic aberration at the imaging process section according to the size thus determined.

30 Claims, 5 Drawing Sheets (51) Int. Cl.
  *G02B 7/02* (2006.01)
  *G03B 17/14* (2006.01)
  *H04N 5/357* (2011.01)
  *G02B 13/00* (2006.01)

(52) U.S. Cl.
  CPC ......... *H04N 5/2254* (2013.01); *H04N 5/3572* (2013.01); *G03B 2217/18* (2013.01)

(58) Field of Classification Search
  USPC .......... 348/229.1, 240.1–240.3, 240.99, 242, 348/270, 273, 343, 353.1
  See application file for complete search history.

(56) References Cited

U.S. PATENT DOCUMENTS

2008/0240709 A1\* 10/2008 Nakamura ............. H04N 5/225
  396/529
2008/0267601 A1   10/2008 Kobayashi
2009/0009633 A1\*  1/2009 Suto ....................... H04N 9/045
  348/241
2010/0103284 A1    4/2010 Sugimori \* cited by examiner

IMAGING APPARATUS AND IMAGING SIGNAL CORRECTING METHOD

This is a Continuation of application Ser. No. 13/076,171, filed Mar. 30, 2011, which is entitled to the priority filing date of Japanese application no. 2010-088960, filed Apr. 7, 2010, the entirety of which is incorporated herein by reference.

BACKGROUND OF THE INVENTION

1. Field of the Invention

The present invention relates to an imaging apparatus such as a video camera and an imaging signal correcting method used in such an imaging apparatus. In particular, the invention relates to such a technique used in lens-interchangeable imaging apparatus.

2. Description of the Related Art

Some imaging apparatus such as video cameras performs correct transverse chromatic aberration of imaging signals obtained by imaging objects using the imagers. Correction of transverse chromatic aberration is to correct signals at each pixel position (in particular, signals of neighboring pixels) in each frame of an imaging signal based on characteristics information concerning aberration of the lens attached to the imaging apparatus of interest.

Correction of transverse chromatic aberration makes it possible to prevent deterioration of image quality attributable to lens aberration, whereby imaging can be performed satisfactorily.

An example of correction of transverse chromatic aberration is described in JP-A-2008-96907 (Patent Document 1). In Patent Document 1, a lens-interchangeable imaging apparatus is described. Lens characteristics information for correcting transverse chromatic aberration is stored in lens devices, and the imaging apparatus reads out the stored lens characteristics information to perform a correction process. The configuration described in Patent Document 1 allows transverse chromatic aberration to be properly corrected even in a lens-interchangeable imaging apparatus.

SUMMARY OF THE INVENTION

Lens devices which can be mounted to a lens-interchangeable imaging apparatus such as a video camera have fixed diameters. For example, referring to typical sizes of lens devices for video cameras, there are lens devices for ⅔-inch imagers and lens devices for ½-inch imagers. A ⅔-inch imager is an imager having an imaging plane with a diagonal length of ⅔ inches.

Lens devices of different sizes have respective lens mount sections having different diameters, and the size of a lens to be mounted to each video camera is fixed.

Although an imaging system has a fixed size as thus described, lens devices having different diameters can be mounted to the imaging apparatus using a conversion adaptor for converting the size of a lens mount section. Specifically, an imaging apparatus which is originally designed to allow a ½-inch lens device to be mounted thereto can be adapted to a ⅔-inch lens device having a greater diameter using a conversion adaptor. Since lenses of different sizes can be mounted using a conversion adaptor as thus described, existing lenses possessed by a user can be effectively used.

When lens devices having different lens diameters are mounted to an imaging apparatus, a problem arises in that transverse chromatic aberration as described above may not be properly corrected. Correction of transverse chromatic aberration is a process of correcting chromatic aberration which varies depending on pixel positions within an image frame to obtain an imaging signal having no chromatic aberration. When a lens attached to an imager is changed to another lens having a different diameter, the image frame of an image height formed by the lens may be different from the image frame of a signal imaged by the imager.

Figure 5:
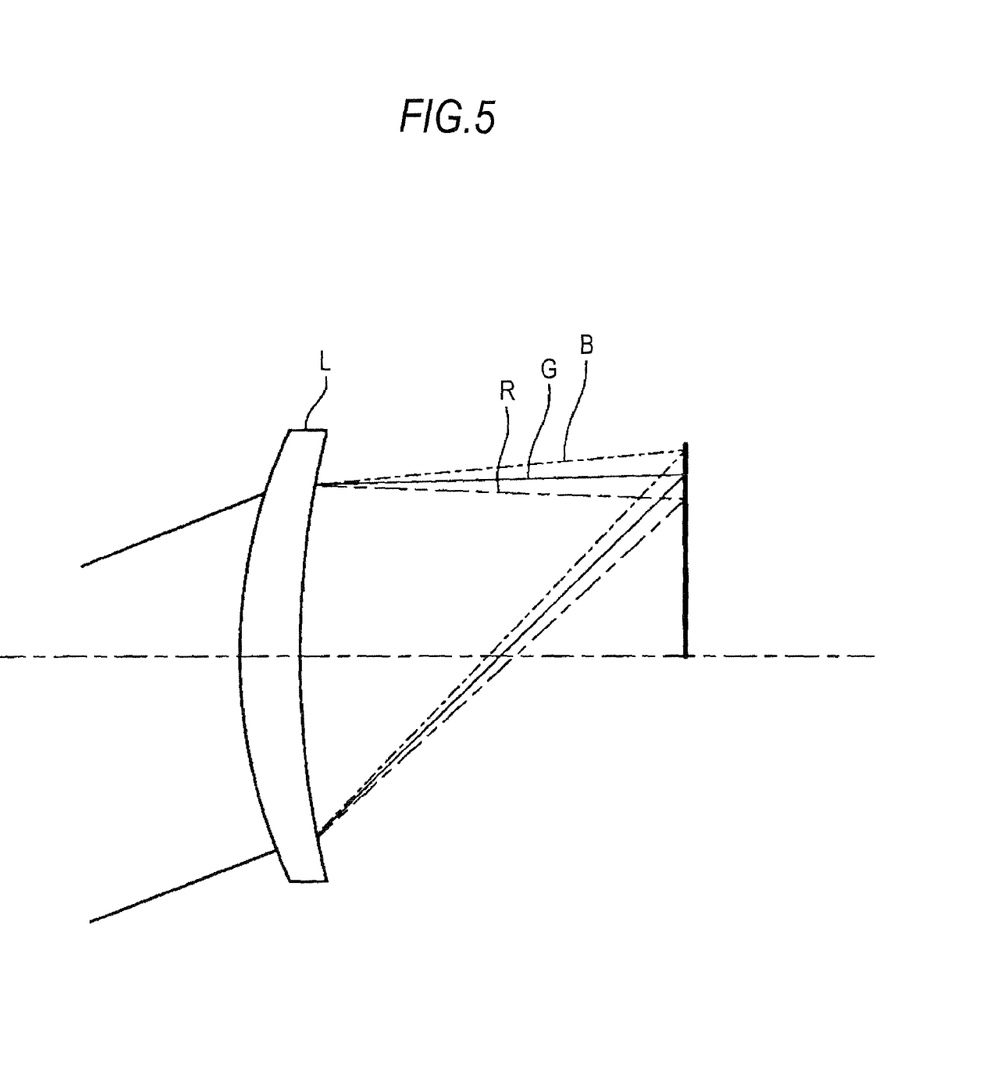
FIG. 5 is an illustration showing a reason why correction of transverse chromatic aberration is required.

FIG. 5 shows a reason why correction of transverse chromatic aberration is required. Preferably, an image is formed through a lens L in a position which remains unchanged regardless of the color of the image when the lens L is an ideal lens. In practice, however, images in red (R), blue (B), and green (G) are formed in positions which are slightly different from each other. In particular, shifts of great amounts occur at peripheral regions apart from the central axis of the lens, as shown in FIG. 5. Such shifts between the positions of colors depend on the characteristics of the lens used, and completely different shifts occur when a lens of a different configuration is used.

In a transverse chromatic aberration correcting process, chromatic aberration is corrected by converting pixel positions such that the positions of pixels in three primary colors which are shifted when imaged will coincide with each other. Specifically, correction is carried out such that a pixel signal in an imaging position of red (R), an imaging signal in an imaging position of blue (B), and an imaging signal in an imaging position of green (G) as shown in FIG. 5 will be converted into pixel signals in the same position.

When a ½-inch lens device mounted to an imaging apparatus is replaced with a ⅔-inch lens device as described above, an object is imaged in a position that is shifted toward a telephoto side compared to a position where the object is imaged by a ⅔-inch imaging apparatus. Therefore, even when the imaging apparatus acquires a correction coefficient for correcting transverse chromatic aberration set for the ⅔-inch lens device mounted to the apparatus as thus described, the imaging apparatus will make an erroneous strong correction because of a difference between image frames of the lenses. Thus, when a lens device is mounted to replace another lens device of a different size, the degradation of image quality can occur.

Under the circumstance, it is desirable to allow an imaging apparatus to perform an imaging process properly regardless of the size of a lens mounted to the apparatus.

According to an embodiment of the invention, transverse chromatic aberration of an imaging signal obtained through an imager is corrected using a correction coefficient specific to a lens device. The diameter of a lens device mounted to a lens mount section is determined, and a correction coefficient for correcting transverse chromatic aberration is corrected according to the determined size to execute a correction process.

As a result, when a lens device is replaced with another lens device having a different lens diameter, a correction coefficient for correcting transverse chromatic aberration of an imaging signal is corrected to allow transverse chromatic aberration to be corrected using a proper correction coefficient.

According to the embodiment of the invention, transverse chromatic aberration can be corrected using a proper correction coefficient regardless of the lens diameter of the lens device mounted to the imaging apparatus of interest, which is advantageous in that imaging can be performed with transverse chromatic aberration properly corrected regardless of lens diameters.

DESCRIPTION OF PREFERRED EMBODIMENTS

Figure 2:
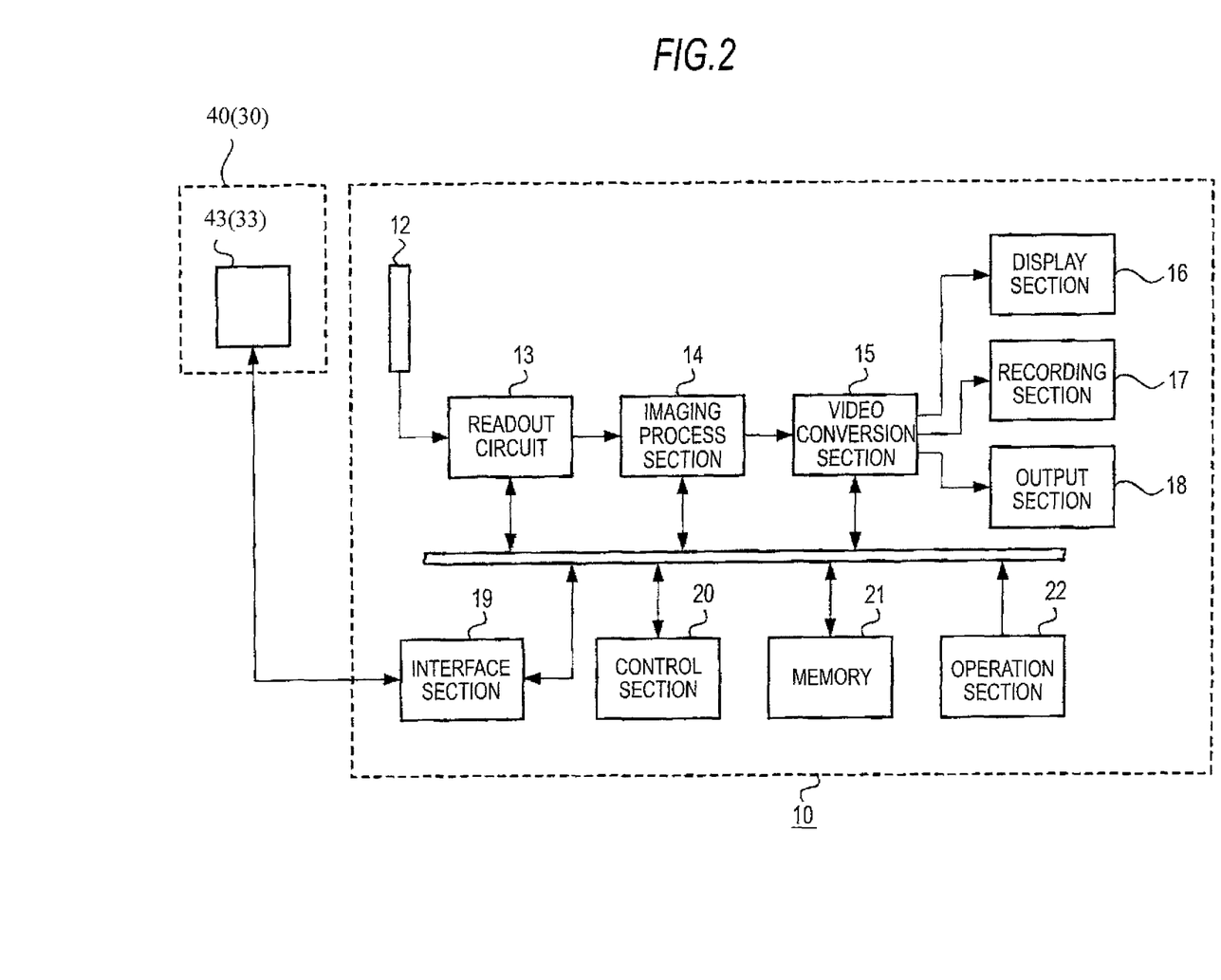
FIG. 2 is a block diagram of the camera apparatus according to the embodiment of the invention showing an exemplary configuration thereof.
Figure 3:
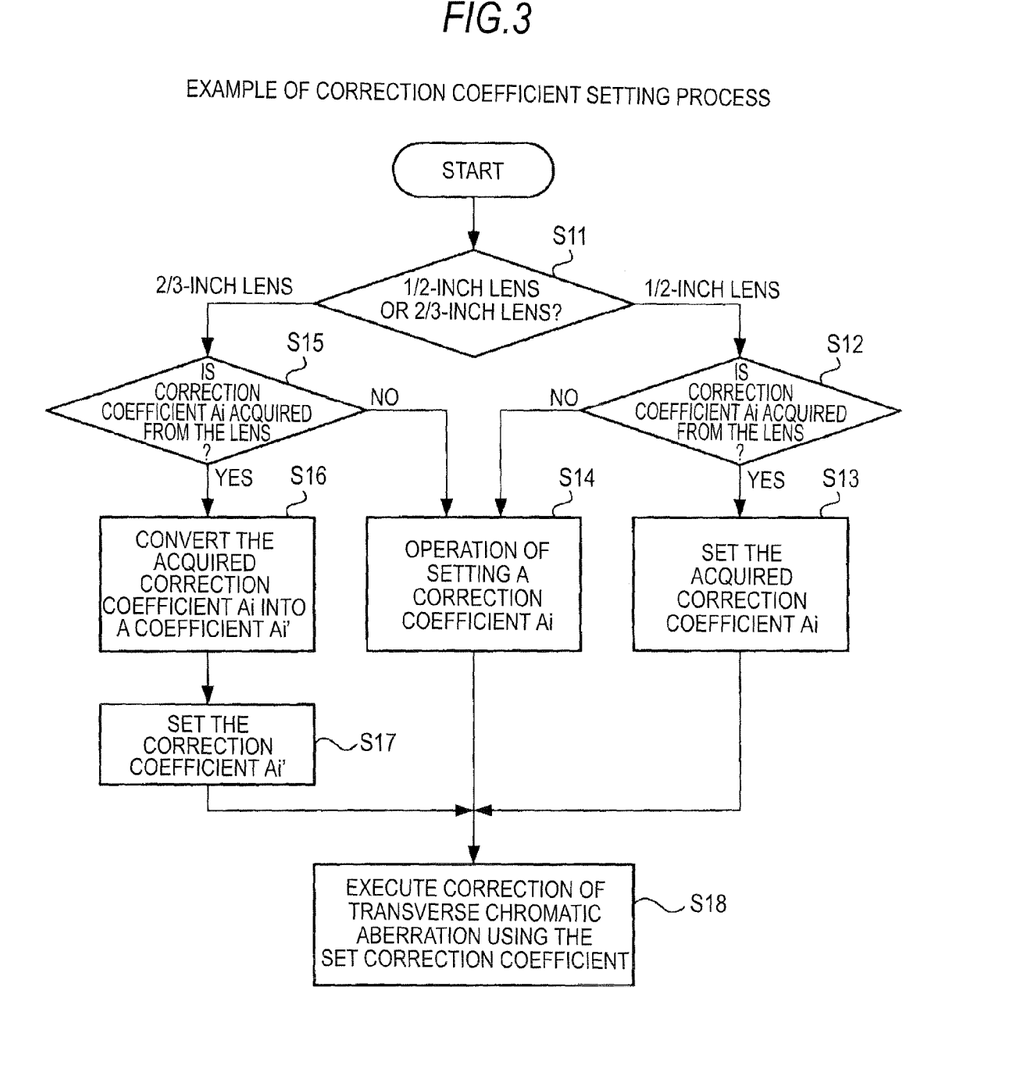
FIG. 3 is a flow chart showing an example of a process of setting a correction coefficient of the camera apparatus according to the embodiment of the invention.
Figure 4:
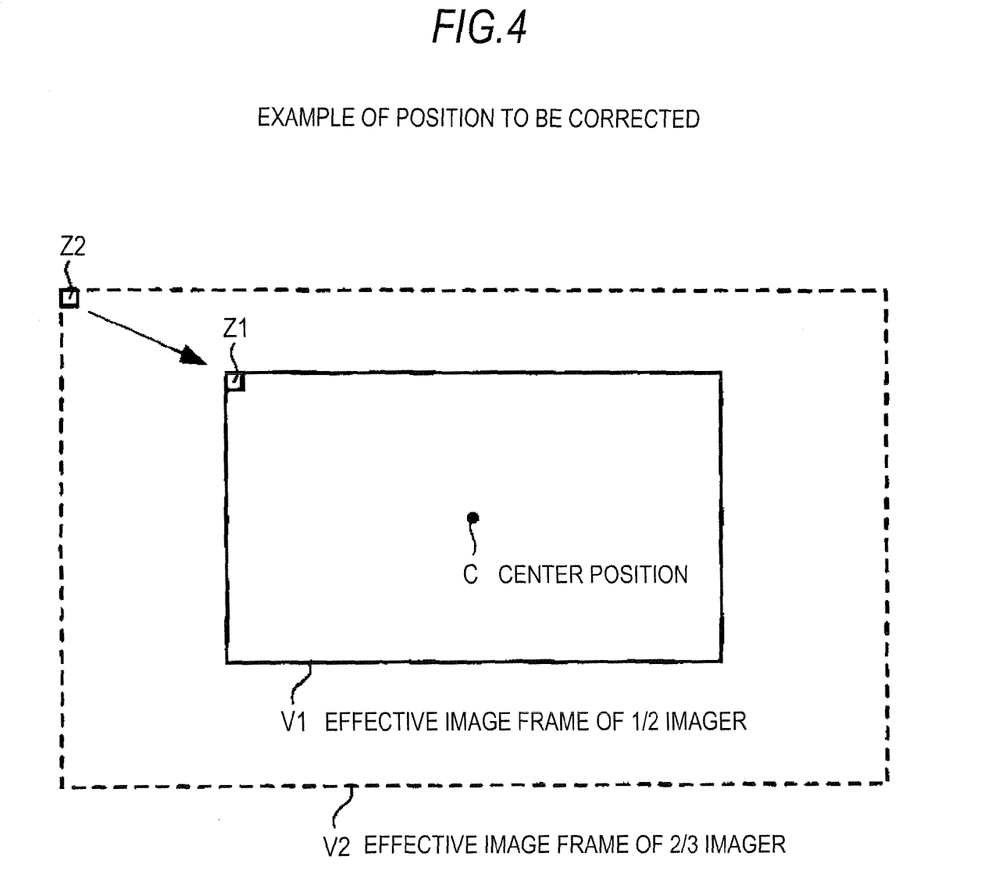
FIG. 4 is an illustration showing a position to be corrected according to the embodiment of the invention.

Details of an embodiment of the invention will now be described in the order listed below.
1, Exemplary System Configuration of the Embodiment (FIG. 1)
2. Exemplary Configuration of Imaging Apparatus of the Embodiment (FIG. 2)
3. Description of a correction coefficient setting process (FIGS. 3 and 4)

[1. Exemplary System Configuration of the Embodiment]

An exemplary system configuration of the embodiment of the invention will now be described with reference to FIG. 1.

Figure 1:
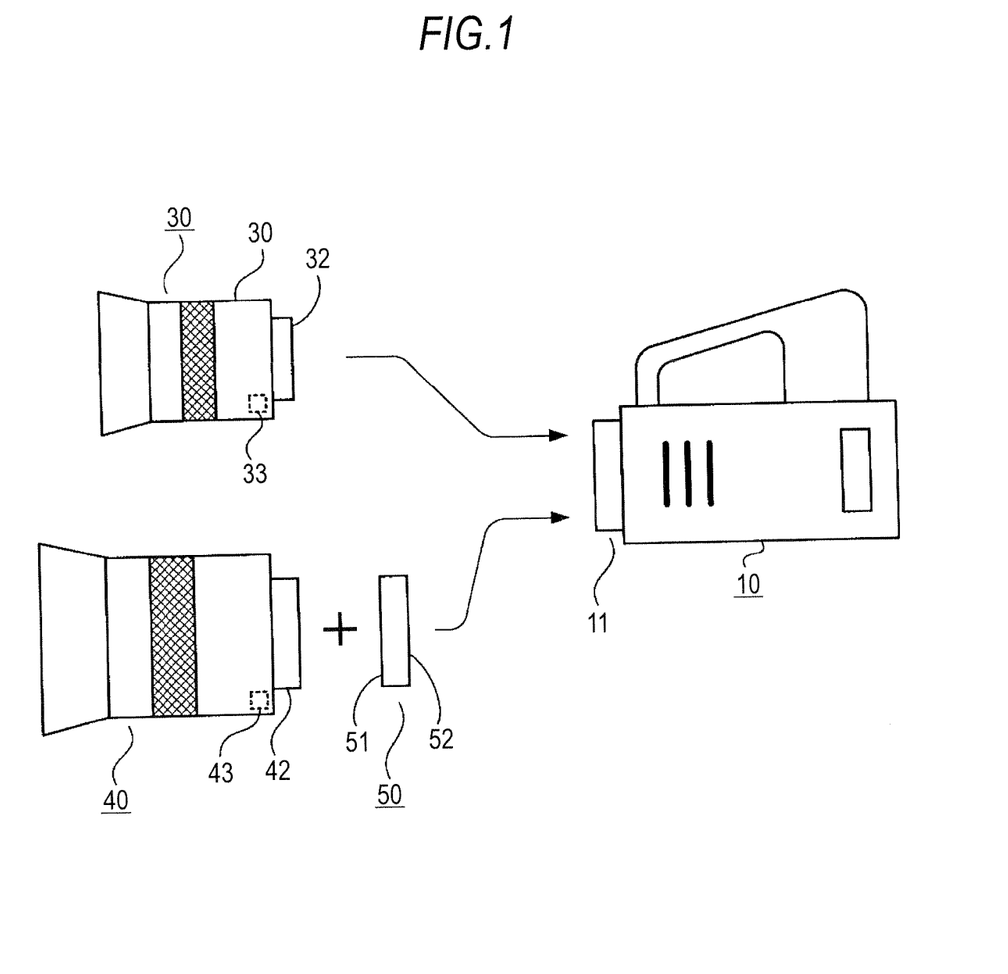
FIG. 1 is illustrations showing an exemplary system configuration of a camera apparatus and lens devices according to an embodiment of the invention.

As shown in FIG. 1, a camera apparatus 10, which is an imaging apparatus, includes a lens mount section 11, and lens devices can be mounted to the lens mount section 11 to allow lenses to be freely used on an interchangeable manner. The lens mount section 11 is a mount section for mounting a ½-inch type lens device 30.

The ½-inch type lens device 30 includes a lens disposed in a lens barrel 31 and a mount section 32 provided at a rear end thereof. The term "½-inch type" indicates that lens device is a lens device to be used with a camera apparatus whose imager has an imaging plane with a diagonal length of ½ in. The mount section 32 is a mount section which is sized to be fitted to the mount section 11 of the camera apparatus. The lens device 30 includes a memory 33 provided in the lens barrel 31, and data specific to the lens device 30 are stored in the memory 33. Lens type data and data of various correction coefficients such as a correction coefficient for correcting transverse chromatic aberration of the lens are stored as the data specific to the lens device 30.

As shown in FIG. 1, the lens mount section 11 of the camera apparatus 10 is configured such that a ⅔-inch type lens device 40 can be mounted to the mount section using a conversion adaptor 50. The term "⅔-inch type" indicates that the ⅔-inch type lens device 40 is a lens device to be used with a camera apparatus whose imager has an imaging plane with a diagonal length of ⅔ in. In general, a lens device of this type has a lens diameter greater than that of a ½-inch type lens device.

The ⅔-inch type lens device 40 includes a ⅔-inch type lens mount section 42 provided at a rear end of a lens barrel 41. The lens device 40 includes a memory 43 provided in the lens barrel 41, and data specific to the lens device 40 are stored in the memory 43. Lens type data and data of various correction coefficients such as a correction coefficient for correcting transverse chromatic aberration of the lens are stored as the data specific to the lens device 40.

The conversion adaptor 50 includes a lens mount section 51 to which a ⅔-inch type lens device is to be mounted and a main body mount section 52 for mounting the adaptor to the apparatus main body which is designed to allow mounting of a ½-inch type less device. The conversion adaptor 50 has the function of repeating the data stored in the memory 43 of the lens device 40 mounted thereto to the main body of the imaging apparatus connected to the main body mount section 52.

[2. Exemplary Configuration of Imaging Apparatus of the Embodiment]

An internal configuration of the camera apparatus 10 or the imaging apparatus will now be described with reference to FIG. 2.

The camera apparatus 10 includes an imager 12. The lens mount section 11 shown in FIG. 1 is provided in front of the imager 12 to allow the lens device 30 to be mounted directly to the apparatus or to allow the lens device 40 to be mounted through the conversion adaptor 50.

When an image having an image height obtained through the lens device thus mounted is formed on an imaging plane of the imager 12, an imaging process is performed to obtain an imaging signal according to the image height of the image formed as thus described. The imager 12 is an imager whose imaging plane has a size adapted to a ½-inch type lens device. Various types of imagers such as CCD imager sensors and CMOS image sensors may be used as the imager 12.

The imaging signal is read out by a readout circuit 13 connected to the imager 12, and the imaging signal read out is supplied to an imaging process section 14. The imaging process section 14 may perform various correction processes on the imaging signal to correct the signal. For example, a transverse chromatic aberration correcting process is performed. A peripheral dimming correcting process may alternatively be performed. Such a correction process at the imaging process section 14 is executed under control exercised by a control section 20. The control section 20 communicates with the lens device mounted to the apparatus through an interface section 19 which is a communication section to acquire a correction coefficient required for the correction process from the memory 33 or 43 of the lens device. A transverse chromatic aberration correcting process is performed using the correction coefficient thus acquired under control exercised by the control section 20. When the control section 20 determines that the lens device mounted is the ⅔-inch type lens device, a correction process is performed to correct the correction coefficient acquired from the memory of the lens device, and a correction calculation process is performed using the corrected correction process. Data required for the correction calculation process are stored in advance in a memory 21.

The imaging signal is supplied to a video conversion section 15 after being corrected by the imaging process section 14 to convert it into a video signal in a predetermined format, and the video signal obtained as a result of the conversion is supplied to a display section 16 and displayed on the same. The video signal obtained by the video conversion section 15 is also supplied to a recording section 17 and recorded therein. Further, the video signal obtained by the video conversion section 15 is supplied to an output section 18 and output from the apparatus.

The camera apparatus 10 includes an operation section 22, and a user can operate the operation section 22 makes various settings. When the mounted lens device has no memory incorporated therein, a menu screen or the like may be displayed to allow a user to select a correction coefficient on the screen by operating the operation section 22. The selected correction coefficient may be stored in the memory 21.

[3. Description of a Correction Coefficient Setting Process]

A description will now be made with reference to the flow chart in FIG. 3 on a process of setting a correction coefficient included in the transverse chromatic aberration correcting process performed by the imaging process section 14.

First, the control section 20 determines whether the lens device mounted to the camera apparatus 10 is the ½-inch type lens device or the ⅔-inch type lens device (step S11). For example, the determination process is performed when the power supply of the camera apparatus 10 is turned on. The process may alternatively be performed when a lens replacing operation is detected.

For example, when the lens type number can be read out from the memory (memory 33 or 43) of the lens device mounted, the determination may be made from such data. When detection can be carried out to determine whether the conversion adaptor 50 is mounted or not, the determination of the lens device type can be made based on whether the conversion adaptor 50 is mounted or not. Further, when the determination cannot be automatically made as thus described, the sizes of the lenses may be registered and stored in the memory 21 through user operations on the operation section 22 when the lenses are mounted, and the determination of the lens device type may be made by reading out the registered lens size data.

When it is determined at step S11 that the mounted device is the ½-inch type lens device, the control section 20 determines whether a correction coefficient Ai for correcting transverse chromatic aberration can be acquired from the mounted lens device or not (step S12). When it is determined that a correction coefficient Ai for correcting transverse chromatic aberration can be acquired, the interface section 19 reads out the correction coefficient Ai of interest from the memory 33 of the lens device, and the control section 20 sets the correction coefficient Ai thus reads out as a coefficient to be used for correction (step S13).

When a correction coefficient Ai for correcting transverse chromatic aberration cannot be acquired from the lens device at step S12 (or when the lens includes no memory), a correction coefficient Ai may be set by a user operation (step S14).

When it is determined at step S11 that the mounted device is the ⅔-inch type lens device, the control section 20 determines whether a correction coefficient Ai for correcting transverse chromatic aberration can be acquired from the mounted lens device or not (step S15). When it is determined that a correction coefficient Ai for correcting transverse chromatic aberration can be acquired, the interface section 19 reads out the correction coefficient Ai of interest from the memory 43 of the lens device. The acquired correction coefficient Ai is converted into a correction coefficient Ai' for a ½-inch type imager (step S16). The control section sets the correction coefficient Ai' obtained by the conversion as a coefficient to be used for correction (step S17).

When a correction coefficient Ai for correcting transverse chromatic aberration cannot be acquired from the lens device at step S15 (or when the lens includes no memory), the process proceeds to step S14 to set a correction coefficient Ai through a user operation.

When the correction coefficient Ai or Ai' is set at step S13, S14, or S17, the process proceeds to step S18 at which the imaging process section 14 performs a transverse chromatic aberration correcting process using the correction coefficient Ai or Ai' thus set (step S18).

An example of correction of transverse chromatic aberration will now be described.

Correction of transverse chromatic aberration is performed according to Expression (1) shown below.

$$Y = \sum_{i=0}^{n} AiX^i \tag{1}$$

In Expression (1), Y represents the amount of a correction [μm] made on an imager; X represents a distance [μm] from the center of the imager; and Ai represents a correction coefficient. At the imaging process section 14, the correction coefficient Ai is multiplied by a coefficient αi to obtain another correction coefficient ai in order to convert the correction represented by a distance into a pixel position. That is, a coefficient ai=αi·Ai is obtained, and transverse chromatic aberration is corrected using the coefficient ai. Correction is carried out using different characteristics for each primary color signal.

When the ½-inch type lens device is mounted, correction is carried out as described above using the correction coefficient Ai read out from the lens device as it is.

When the ⅔-inch type les device is mounted, the correction coefficient Ai is further multiplied by a conversion coefficient Ui. That is, a coefficient ai=Ui·αi·Ai is obtained, and transverse chromatic aberration is corrected using the coefficient ai.

Specifically, the conversion coefficient Ui equals $(8/11)^i$ because the ½-inch imager has a diagonal size of about 8 mm and the ⅔-inch image has a diagonal size of about 11 mm.

Let us assume that the ½-inch imager has an effective image frame V1 and that the ⅔-inch imager has an effective image frame V2, as shown in FIG. 4. When an imaging signal is corrected as thus described, a correction applied to a pixel Z2 at a corner of the image frame V2 is not applied as it is to a pixel Z1 at a corner of the image frame V1. In this example, correction is carried out with the difference between the sizes of the image frames corrected. Therefore, correction can be properly carried out even when lens devices having different sizes are used.

A correction process for correcting transverse chromatic aberration has been described above, and correction of peripheral dimming may be carried out using a similar process. Specifically, a correction coefficient for correcting peripheral dimming may be acquired from a lens device, and the acquired correction coefficient may be corrected according to the size of the lens. Unlike the correction of transverse chromatic aberration, the correction of peripheral dimming is similarly performed regardless of colors.

The sizes of imagers in the above description of the embodiment are merely shown as examples, and the invention is not limited to such examples. For example, lenses of other sizes such as a lens for a ⅓-inch type imager may be used. Different correction coefficients may be provided to accommodate lenses of three or more sizes, respectively.

While correction of transverse chromatic aberration and correction of peripheral dimming has been described above, other characteristics of an imaging signal may be corrected using a similar process as long as the correction is carried out based on lens characteristics.

While the above-described embodiment is an example of the application of the invention to a video camera as an imaging apparatus, the invention may be applied to other types of lens-interchangeable imaging apparatus such as electronic still cameras.

The present application contains subject matter related to that disclosed in Japanese Priority Patent Application JP 2010-088960 filed in the Japan Patent Office on Apr. 7, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
a lens mount section configured to mount, directly or via a conversion adaptor, an interchangeable lens device including a memory storing (a) correction data and (b) lens type data specific to the interchangeable lens device;
an imager configured to output an imaging signal; and
circuitry configured to correct the imaging signal obtained by the imager based on (a) the correction data and the lens type data specific to the interchangeable lens device and (b) a difference between (1) an imager size based on the lens type data for the interchangeable lens device mounted to the lens mount section and (2) an imager size of the imager of the imaging apparatus, wherein the circuitry is further configured to communicate, directly or via the conversion adapter, with the interchangeable lens device mounted to the lens mount section in order to obtain the correction data and lens type data specific to the interchangeable lens device.

2. The imaging apparatus of claim 1, wherein
the circuitry is configured to
when the interchangeable lens device is mounted directly to the lens mount section, correct the imaging signal obtained by the imager using the correction data specific to the interchangeable lens device and not based on the difference between (a) the imager size for the interchangeable lens device mounted to the lens mount section and (b) the imager size of the imager of the imaging apparatus; and
when the interchangeable lens device is mounted to the lens mount section via the conversion adapter, correct the imaging signal obtained by the imager based on the correction data specific to the interchangeable lens device, the imager size for the interchangeable lens device mounted to the lens mount section and the imager size of the imager of the imaging apparatus.

3. The imaging apparatus of claim 2, wherein
the circuitry is configured to use, when the interchangeable lens device is mounted to the lens mount section via the conversion adapter, data that is converted from the correction data.

4. The imaging apparatus of claim 3, wherein
the circuitry is further configured to convert the correction data based on the difference between the imager size for the interchangeable lens device mounted to the lens mount section and the imager size of the imager of the imaging apparatus.

5. The imaging apparatus of claim 1, wherein
the circuitry is configured to correct transverse chromatic aberration of the imaging signal based on the correction data for transverse chromatic aberration.

6. The imaging apparatus of claim 1, wherein
the circuitry is configured to correct peripheral dimming of the imaging signal based on the correction data for peripheral dimming.

7. The imaging apparatus of claim 1, wherein the circuitry is configured to determine the imager size for the interchangeable lens device based on lens type data of the interchangeable lens device.

8. The imaging apparatus of claim 1, wherein the circuitry is configured to determine the imager size for the interchangeable lens device based on whether the conversion adaptor is mounted to the lens mount section or not.

9. The imaging apparatus of claim 8, wherein the circuitry is configured to determine that the imager size for the interchangeable lens device is ⅔ inch when the conversion adaptor is mounted to the lens mount section.

10. The imaging apparatus of claim 1, wherein the circuitry is configured to determine the imager size for the interchangeable lens device based on lens size data stored in a second memory of the imaging apparatus.

11. The imaging apparatus of claim 1, wherein the circuitry is configured to control displaying a menu screen to allow a user to select correction data specific to the interchangeable lens device, the correction data being stored in a second memory of the imaging apparatus.

12. The imaging apparatus of claim 1, wherein the circuitry is configured to
when the imager size for the interchangeable lens device is substantially the same as the imager size of the imager of the imaging apparatus, correct the imaging signal obtained by the imager using the correction data specific to the interchangeable lens device and not based on the difference between (a) the imager size for the interchangeable lens device and (b) the imager size of the imager of the imaging apparatus; and
when the imager size for the interchangeable lens device is not substantially the same as the imager size of the imager of the imaging apparatus, correct the imaging signal obtained by the imager using data that is converted from the correction data based on the difference between (1) the imager size for the interchangeable lens device and (2) the imager size of the imager of the imaging apparatus.

13. An image processing apparatus comprising:
circuitry configured to
correct an imaging signal, obtained by an imager of an imaging apparatus based on (a) correction data and lens type data specific to an interchangeable lens device and (b) a difference between (1) an imager size based on the lens type data for the interchangeable lens device mounted, directly or via a conversion adapter, to a lens mount section of the imaging apparatus and (2) an imager size of the imager of the imaging apparatus, wherein the circuitry is further configured to communicate, directly or via the conversion adapter, with the interchangeable lens device in order to obtain the correction data and lens type data specific to the interchangeable lens device.

14. The image processing apparatus of claim 13, wherein the circuitry is configured to
when the imager size for the interchangeable lens device is substantially the same as the imager size of the imager of the imaging apparatus, correct the imaging signal obtained by the imager using the correction data specific to the interchangeable lens device and not based on the difference between (a) the imager size for the interchangeable lens device and (b) the imager size of the imager of the imaging apparatus; and when the imager size for the interchangeable lens device is not substantially the same as the imager size of the imager of the imaging apparatus, correct the imaging signal obtained by the imager using data that is converted from the correction data based on the difference between (1) the imager size for the interchangeable lens device and (2) the imager size of the imager of the imaging apparatus.

15. The image processing apparatus of claim 14, wherein the circuitry is further configured to convert the correction data based on the difference between the imager size for the interchangeable lens device and the imager size of the imager of the imaging apparatus.

16. The image processing apparatus of claim 14, wherein the circuitry is further configured to determine if the imager size for the interchangeable lens device is substantially the same as the imager size of the imager of the imaging apparatus.

17. The image processing apparatus of claim 16, wherein the circuitry is configured to determine that the imager size for the interchangeable lens device is not substantially the same as the imager size of the imager of the imaging apparatus when the interchangeable lens device is mounted to a lens mount section via the conversion adapter.

18. The image processing apparatus of claim 13, wherein the circuitry is configured to correct transverse chromatic aberration of the imaging signal based on the correction data for transverse chromatic aberration.

19. The image processing apparatus of claim 13, wherein the circuitry is configured to correct peripheral dimming of the imaging signal based on the correction data for peripheral dimming.

20. The image processing apparatus of claim 13, wherein the circuitry is configured to determine the imager size for the interchangeable lens device based on lens type data of the interchangeable lens device.

21. The image processing apparatus of claim 13, wherein the circuitry is configured to determine the imager size for the interchangeable lens device based on whether the conversion adaptor is mounted to the lens mount section or not.

22. The image processing apparatus of claim 21, wherein the circuitry is configured to determine that the imager size for the interchangeable lens device is ⅔ inch when the conversion adaptor is mounted to the lens mount section.

23. The image processing apparatus of claim 13, wherein the circuitry is configured to determine the imager size for the interchangeable lens device based on lens size data stored in a memory of the image processing apparatus.

24. The image processing apparatus of claim 13, wherein the circuitry is configured to control displaying a menu screen to allow a user to select correction data specific to the interchangeable lens device, the correction data being stored in a memory of the imaging processing apparatus.

25. The image processing apparatus of claim 13, wherein the circuitry is configured to when the interchangeable lens device is mounted directly to the lens mount section, correct the imaging signal obtained by the imager using the correction data specific to the interchangeable lens device and not based on the difference between (a) the imager size for the interchangeable lens device mounted to the lens mount section and (b) the imager size of the imager of the imaging apparatus; and when the interchangeable lens device is mounted to the lens mount section via the conversion adapter, correct the imaging signal obtained by the imager based on the correction data specific to the interchangeable lens device, the imager size for the interchangeable lens device mounted to the lens mount section and the imager size of the imager of the imaging apparatus.

26. An image processing method comprising the steps of:
correcting an imaging signal, obtained by an imager of an imaging apparatus, based on (a) correction data and lens type data specific to an interchangeable lens device and (b) a difference between (1) an imager size based on the lens type data for the interchangeable lens device mounted, directly or via a conversion adapter, to a lens mount section of the imaging apparatus and (2) an imager size of the imager of the imaging apparatus; and communicating, directly or via a conversion adapter, with the interchangeable lens device in order to obtain the correction data and lens type data specific to the interchangeable lens device.

27. The method according to claim 26, further comprising when the imager size for the interchangeable lens device is substantially the same as the imager size of the imager of the imaging apparatus, correcting the imaging signal obtained by the imager using the correction data specific to the interchangeable lens device and not based on the difference between (1) the imager size for the interchangeable lens device and (2) the imager size of the imager of the imaging apparatus.

28. The method according to claim 26, further comprising when the imager size for the interchangeable lens device is not substantially the same as the imager size of the imager of the imaging apparatus, correcting the imaging signal obtained by the imager using data that is converted from the correction data based on the difference between (1) the imager size for the interchangeable lens device and (2) the imager size of the imager of the imaging apparatus.

29. The method according to claim 26, further comprising correcting transverse chromatic aberration of the imaging signal based on the correction data for transverse chromatic aberration.

30. The method according to claim 26 further comprising correcting peripheral dimming of the imaging signal based on the correction data for peripheral dimming.

* * * * *